United States Patent [19]

Walker et al.

[11] Patent Number: 4,722,300
[45] Date of Patent: Feb. 2, 1988

[54] AUTOMATIC FEEDER FOR PETS AND OTHER ANIMALS

[75] Inventors: Douglas G. Walker; Robert A. Scott, both of Westminster, Md.

[73] Assignee: Beacon Industries, Inc., Westminster, Md.

[21] Appl. No.: 838,257

[22] Filed: Mar. 10, 1986

[51] Int. Cl.$^4$ .............................................. A01K 5/02
[52] U.S. Cl. ................................ 119/51.11; 222/650; 366/114; 119/51.15
[58] Field of Search ............... 119/51 R, 51.11, 51.15; 366/114, 128; 222/639, 650; 414/304

[56] References Cited

U.S. PATENT DOCUMENTS

| | | | |
|---|---|---|---|
| 2,785,831 | 3/1957 | Smolin | 222/650 |
| 3,256,861 | 6/1966 | Giltner | 222/650 X |
| 3,295,838 | 1/1967 | Ban | 366/114 |
| 3,623,106 | 11/1971 | Isaacson | 366/114 |
| 3,791,558 | 12/1974 | Katusha | 366/114 X |
| 4,062,527 | 12/1977 | Schmitz | 366/114 |
| 4,079,699 | 3/1978 | Longmore et al. | 119/51.11 |
| 4,175,679 | 11/1979 | Ponce et al. | 222/650 |
| 4,235,200 | 11/1980 | Shay | 119/51.11 |
| 4,284,035 | 8/1981 | White | 119/51.11 |
| 4,315,483 | 2/1982 | Scheidler | 119/51.11 |
| 4,437,595 | 3/1984 | Steven et al. | 119/51.11 X |

Primary Examiner—William F. Pate, III
Assistant Examiner—Creighton Smith
Attorney, Agent, or Firm—Leonard Bloom

[57] ABSTRACT

A programmable automatic feeder for pets and other animals dispenses a measured amount of food at a predetermined time. A digital clock control mechanism, including an adjustable portion control knob, controls the energization of a battery-operated motor. The motor drives an eccentric weight to vibrate a vibrating conveyor pan attached to the motor. The vibrating conveyor pan is resiliently mounted on a fixed plate secured within the housing, and the vibrating conveyor pan is disposed below the open bottom portion of a hopper disposed within the housing. When the vibrating conveyor pan is vibrated, the food is dispensed rearwardly off the pan and into a curved chute. The food falls down the chute and is accessible to the animal through an opening in the front wall of the housing.

22 Claims, 8 Drawing Figures

AUTOMATIC FEEDER FOR PETS AND OTHER ANIMALS

FIELD OF THE INVENTION

The present invention relates to an automatic feeder for animals, and more particularly, to a programmable automatic feeder arranged to dispense a substantially measured quantity of food at a predetermined time, and intended for pets, domestic animals, fish, wild fowl and birds, breeding poultry and livestock.

BACKGROUND OF THE INVENTION

Domestic animals are usually rather picky about their food; and if the food has been around for sometime, it becomes stale and unpalatable to the pet. On the other hand, if a large quantity of food is immediately available, some pets may gorge themselves and become overweight and unhealthy. In an attempt to rectify this problem, especially when the pet owners are not in the home, various types of feeders have been disclosed in the prior art for dogs, cats or other pets.

For example, in U.S. Pat. No. 3,527,191, a clock and timer are used to control the energization of a motor to drive a food discharge shaft to dispense the pet food via a chute to a feed pan. Additionally, a transverse shaft is geared to the food discharge shaft to control the opening of a valve in a water discharge pipe between a closed tank and a water trough, such that a measured amount of water is available to the pet simultaneously with the pet food.

A further example is disclosed in U.S. Pat. No. 3,949,909, wherein a vibrator is disposed within an insert sleeve suspended within the bottom opening of a frustoconically-shaped container for dispensing fish food. The vibrator includes a vibrating portion mounted on a food dispensing plate disposed a predetermined distance below an opening in the bottom of the insert sleeve. Additionally, vibrating devices are generally well known, wherein a motor drives a shaft carrying an eccentric weight, such as disclosed in U.S. Pat. Nos. 3,161,993 and 4,167,341.

Additional prior art patents known to the applicant are as follows:

| Inventor(s) | Patent No. |
| --- | --- |
| Kuxmann | 1,207,938 |
| Wolfe | 2,701,548 |
| Franklin | 2,791,984 |
| Decker | 3,171,385 |
| Strother | 3,638,618 |
| Gower | 4,069,793 |
| Longmore et al | 4,077,699 |
| Peterson | 4,182,273 |
| White | 4,284,035 |
| Scheidler | 4,315,483 |
| Fassauer | 4,513,688 |

Despite these teachings in the prior art, the need remains for a commercially practical, reliable, automatic pet feeder, one which may be readily programmed to deliver a substantially measured amount of pet food at a predetermined time.

SUMMARY OF THE INVENTION

Accordingly, it is an object of the present invention to alleviate the disadvantages and deficiencies of the prior art by providing an automatic feeder having a digital clock mechanism for controlling the dispensing of a substantially measured amount of food at a predetermined time.

It is another object of the present invention to provide an automatic feeder that may be programmed easily and conveniently, and may be tested to assure proper performance.

It is yet another object of the present invention to provide a programmable automatic feeder having a unique vibrating conveyor pan for dispensing the measured amount of food.

It is a further object of the present invention to provide a commercially practical and reliable feeder for rendering trouble-free performance for many years.

It is a still further object of the present invention to provide a feeder that is powered by just two ordinary flashlight batteries, thereby avoiding line voltages for complete electrical safety, and thereby assuring complete portability of the feeder.

It is a yet still further object of the present invention to provide a unique vibrating means for dispensing the food, thereby avoiding the use of augers or pusher rods habitually resorted to in the prior art, and thereby substantially reducing the power requirements of the feeder.

It is, again, a further object of the present invention to provide an automatic feeder that may be manufactured conveniently and relatively inexpensively from readily available materials and components, thereby facilitating widespread marketing and distribution through a variety of consumer marketing channels.

In accordance with the teachings of the present invention, there is herein illustrated and described, a preferred embodiment of an automatic feeder, wherein the feeder includes a housing having a hopper, and further includes a removable closure means providing access to the hopper such that food may be placed in the hopper. A vibrating feed conveyor means is disposed below the open bottom of the hopper for receiving the food. Resilient means are provided for supporting the vibrating feed conveyor means, and motor driven means are further provided for vibrating the vibrating feed conveyor means. An adjustable timing means controls the energization of the motor driven means, and a trough is disposed in the housing substantially adjacent to the vibrating feed conveyor means. With this arrangement, when the motor driven means is actuated via the timing means, a substantially measured amount of food is dispensed from the vibrating feed conveyor means to the trough; and the housing has further means to enable the animal to receive the food in the trough.

Preferably, the housing is substantially prismatic and is provided with an open top, and the removable closure means comprises a lid covering the open top and removably secured thereto by latches. The vibrating feed conveyor means comprises a vibrating conveyor pan having three closed sides and further having an open end confronting a curved chute or trough into which the food is dispensed at predetermined times. The vibrating conveyor pan is resiliently mounted on a plurality of springs carried by a plate fixed in the housing. A motor is carried by the bottom surface of the vibrating conveyor pan; and the motor has a shaft provided with an eccentric weight, such that the conveyor pan is vibrated when the motor is energized under the control of the adjustable timing means.

In the preferred construction, the motor-driven vibrating conveyor pan discharges the food rearwardly into an arcuate chute; and the food falls down the chute and towards the front of the feeder, where the food is available to the animal through an opening formed in the front of the housing.

Preferably, the adjustable timing means comprises a digital clock control mechanism which includes: (a) means for setting the current time as to hours and minutes; (b) means for setting the hour and minute for energizing the motor to actuate the vibrating conveyor pan to dispense the food; (c) means to adjust the feed portion by controlling the amount of time that the motor is energized; and (d) feed test means to assure that the feeder is in working order and to test the actual portion of food being dispensed.

In the preferred embodiment, the motor and the digital clock control mechanism are both energized by merely two flashlight-type batteries. The batteries should be kept relatively "fresh", and if desired, additional batteries or rechargeable energy cells could be used.

While the preferred embodiment herein disclosed is intended primary for pets, the teachings of the present invention are equally applicable to a wide variety of animals. For example, breeder hens for broilers, as well as turkeys, are more productive when the amount of feed is regulated as to time and amount; and the present invention facilitates this objective on an individual feeding station basis. Additionally, fish and water fowl can be fed at specific times in remote lakes or ponds and with regulated amounts to reduce feed waste. By regulating the feeding times of wild birds, their habits can be more readily observed by bird watchers in remote or controlled areas.

These and other objects of the present invention will become apparent from a reading of the following specification, taken in conjunction with the enclosed drawings.

GENERAL DESCRIPTION OF THE PREFERRED EMBODIMENT

Figure 1:
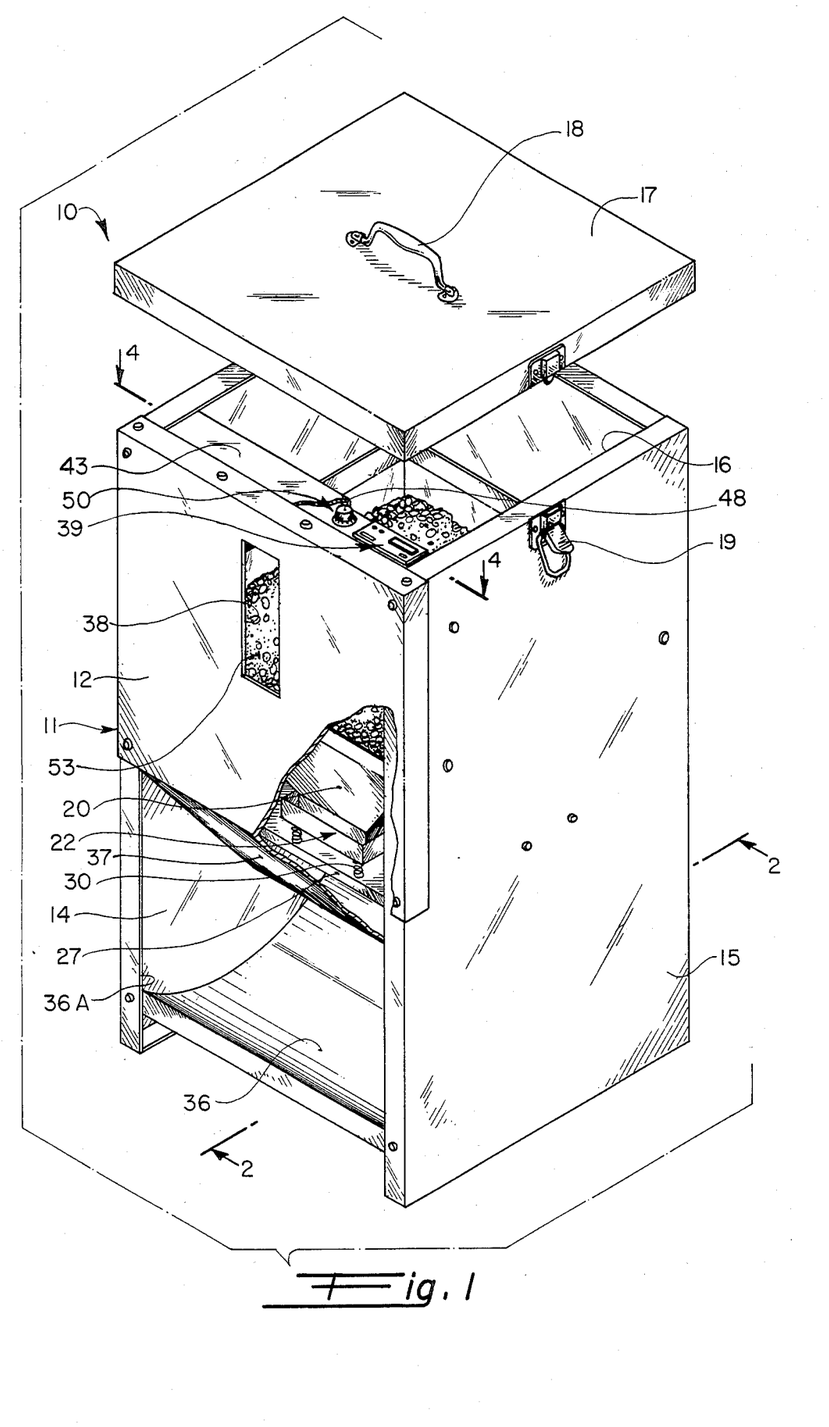
FIG. 1 is an isometric view of the automatic feeder of the present invention, with the lid removed to show the digital clock control mechanism and motor control timing circuit, with parts broken away to show the hopper into which the food is placed initially.
Figure 2:
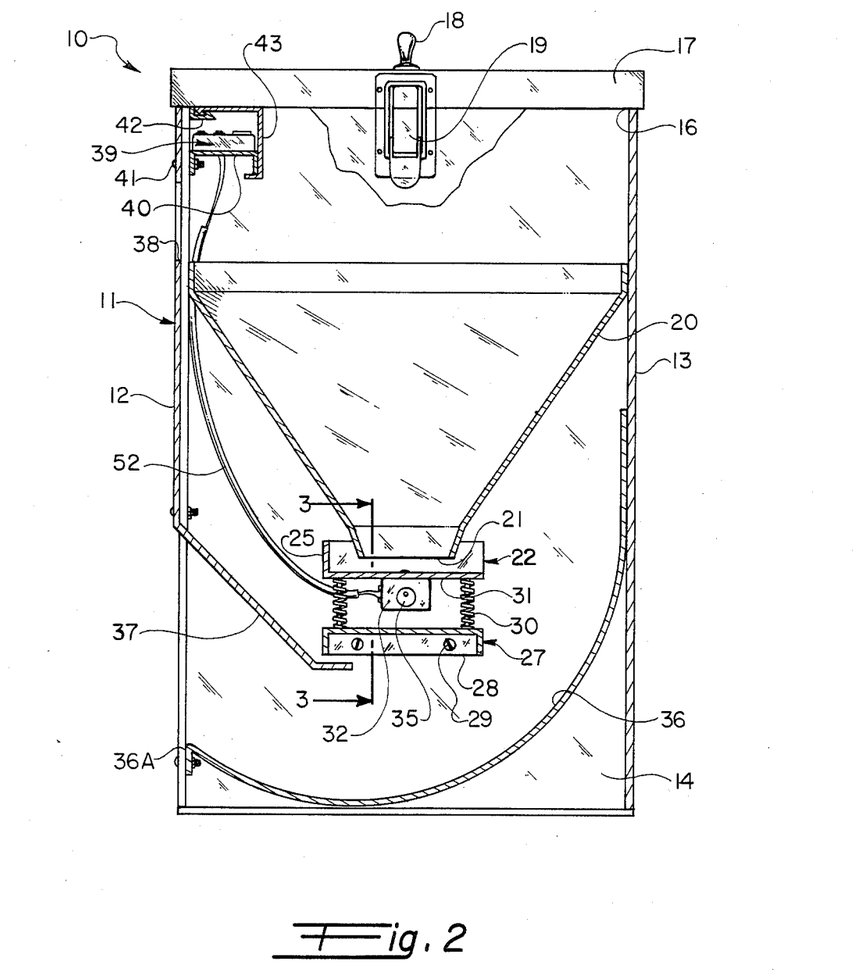
FIG. 2 is a longitudinal cross-section thereof, taken across the lines 2—2 of FIG. 1, and showing the vibrating conveyor pan resiliently mounted in the housing and disposed below the open bottom of the hopper.

With reference to FIGS. 1 and 2, there is disclosed a preferred embodiment of the automatic feeder 10 of the present invention. This feeder 10 is especially intended for pets and domestic creatures, but its teachings are equally applicable to animals in general, such as fish, wild fowl and birds and breeding poultry. With this in mind, the automatic feeder 10 has a housing 11 of preferably prismatic configuration. The housing 11 includes a front wall 12, rear wall 13, parallel side walls 14 and 15, and an open top 16. The open top 16 of the housing is covered by a removable lid 17 having a handle 18. The lid 17 is removably secured to the side walls of the housing by a pair of latches, one of which is illustrated as at 19 in FIGS. 1 and 2.

Figure 6:
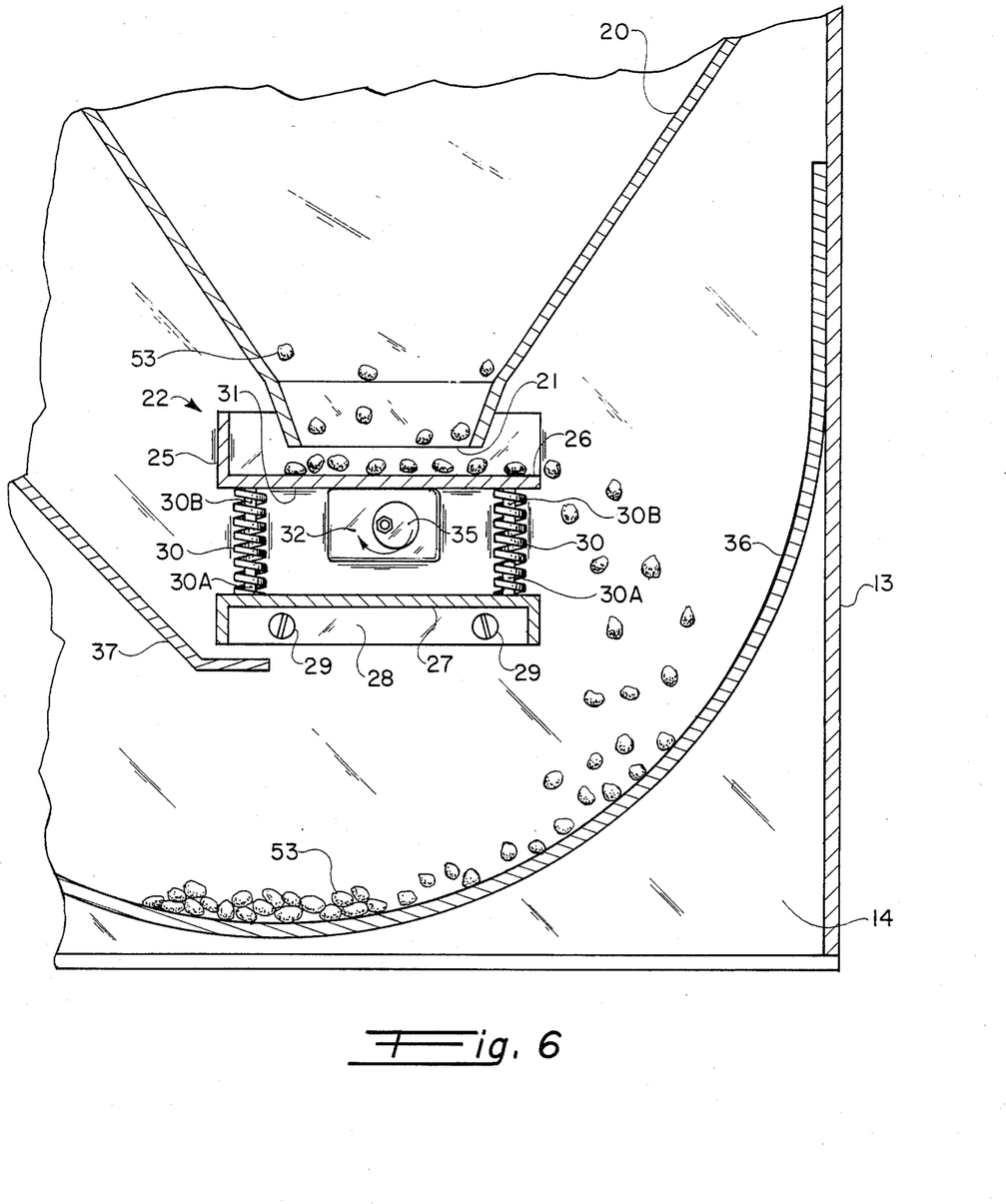
FIG. 6 is a portion of FIG. 2, drawn to an enlarged scale, and showing the operation of the vibrating conveyor pan to dispense the food on to the curved trough.
Figure 7:
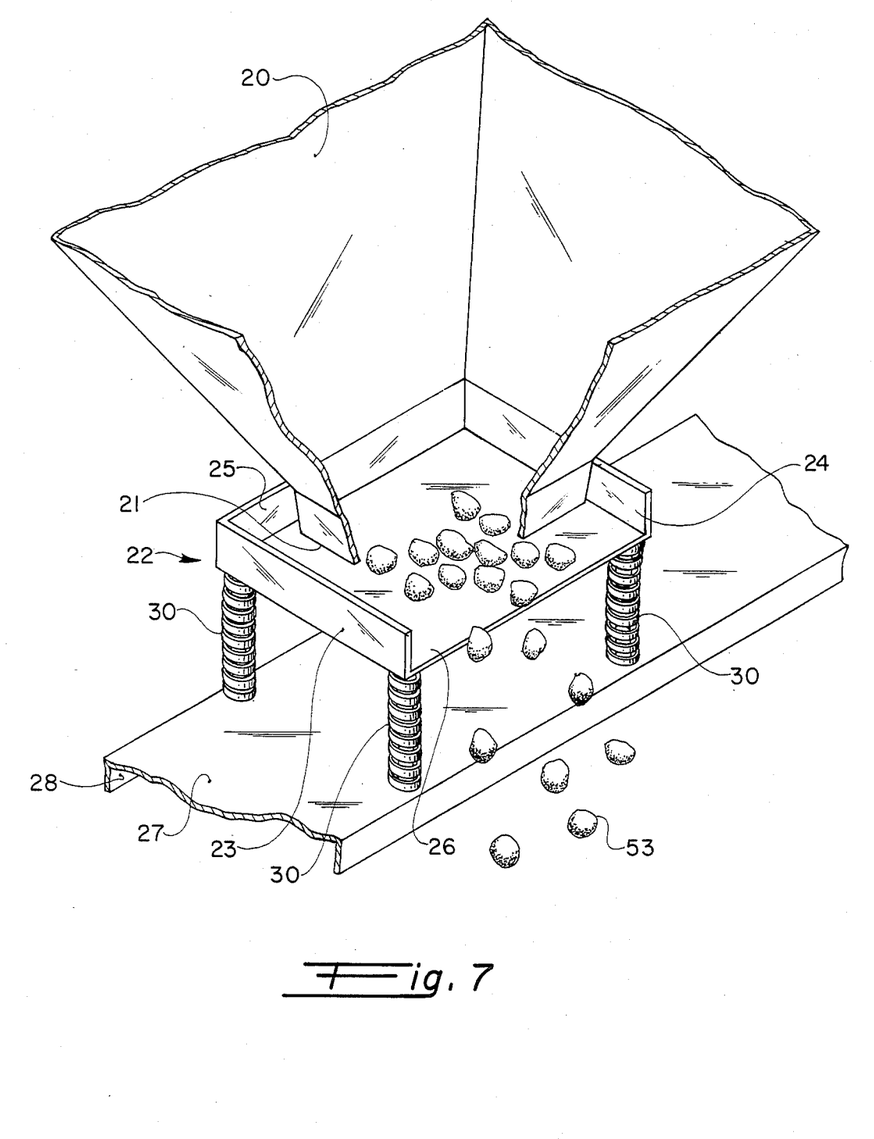
FIG. 7 is an isometric view, looking from the rear of the housing, and with part of the hopper being broken away to show the food being dispensed from the vibrating conveyor pan.

A hopper 20 is secured within the housing, as shown more clearly in FIG. 2; and the hopper preferably has a substantially inverted pyramidal form, as shown more clearly in FIG. 7. Disposed below the open bottom 21 of the hopper is a vibrating conveyor pan 22; and when the food is placed in the hopper (upon removal of the lid), a quantity of the food will fall through the open bottom of the hopper and will rest upon the vibrating conveyor pan 22. This vibrating conveyor pan 22 is preferably formed as a plate disposed substantially parallel to the open bottom of the hopper and spaced therefrom, as shown more clearly in FIGS. 2 and 3; and the vibrating conveyor pan 22 has three closed (or upstanding) sides 23, 24 and 25, respectively, and further has an open end portion 26, as shown more clearly in FIG. 6.

A fixed plate 27 is secured within the housing and is disposed directly below the vibrating conveyor pan, being spaced therefrom. The plate 27 is preferably an inverted U-shaped channel (as shown more clearly in FIG. 7) and the plate 27 has end flanges, one of which is shown as at 28 in FIG. 2, being secured to the respective side wall 14 by screws 29. A plurality of upstanding coil springs 30 (preferably four) are supported on the fixed plate and are disposed between the fixed plate and the vibrating conveyor pan. The coil springs 30 are piloted on lugs 30A and 30B carried by the fixed plate 27 and the vibrating conveyor pan 22, respectively. With this arrangement, the vibrating conveyor pan is resiliently mounted within the housing and is disposed substantially centrally thereof.

Figure 3:
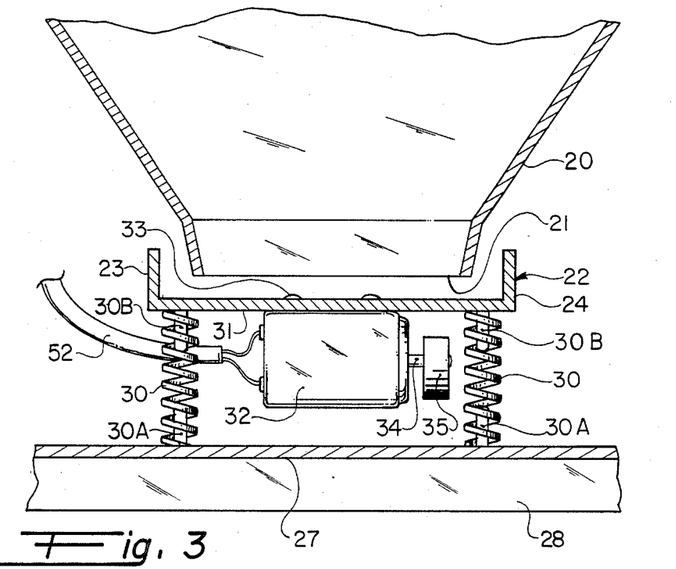
FIG. 3 is a cross-section thereof, taken across the lines 3—3 of FIG. 2 and drawn to an enlarged scale, and showing the motor carried by the bottom surface of the vibrating conveyor pan, the motor having a rotating shaft provided with an eccentric weight.

The vibrating conveyor pan 22 has a bottom surface 31 to which a battery-operated motor 32 is secured thereto by screws 33, as shown more clearly in FIGS. 3 and 6. The motor has a rotating shaft 34 which carries an eccentric weight 35. The vibrations developed by the rotating eccentric weight, when the motor is energized, induce vibrations in the vibrating conveyor pan 22 substantially in the plane thereof.

A curved chute (or arcuate trough) 36 is disposed rearwardly of the open end of the vibrating conveyor pan, as shown more clearly in FIG. 2, and is preferably made of stainless steel. The chute 36 extends downwardly from the rear wall of the housing to the lower portion of the forward wall of the housing; and as shown more clearly in FIG. 1, extends laterally between the respective parallel side walls of the housing.

The lower portion of the front wall of the housing has an opening 36A formed therein; and when the food is dispensed at the predetermined time, the food is readily accessible to the pet, with the lower front end of the curved chute serving as a food tray. The lower portion of the front wall of the housing is bent inwardly to form a baffle 37 to protect the pet (or other animal) from reaching up into the housing, thereby precluding contact with the vibrating conveyor pan. The upper portion of the front wall of the housing has a vertically slotted window 38 formed therein, again as shown more clearly in FIG. 1, so that the level of the food within the hopper can be determined by a convenient visual inspection without the necessity for removing the lid.

The vibrations of the conveyor pan 22 sounds like a buzzer and, in effect, alert the animal that the food is being dispensed. By the same token, however, the animal will be warned not to stick its head through the opening 36A until the buzzing sound of the vibrations has ceased.

Figure 4:
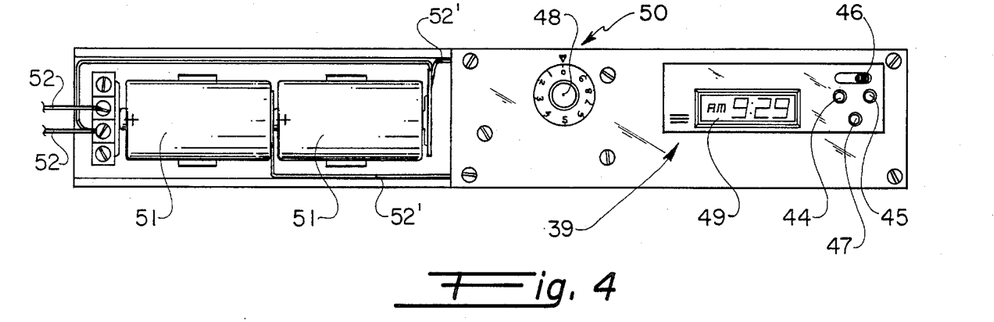
FIG. 4 is a top plan view of the digital clock control mechanism and the motor control timing circuit, taken across the lines 4—4 of FIG. 1 and drawn to an enlarged scale, and with parts broken away to show the flashlight-type batteries to energize the motor and the digital clock control mechanism.
Figure 8:
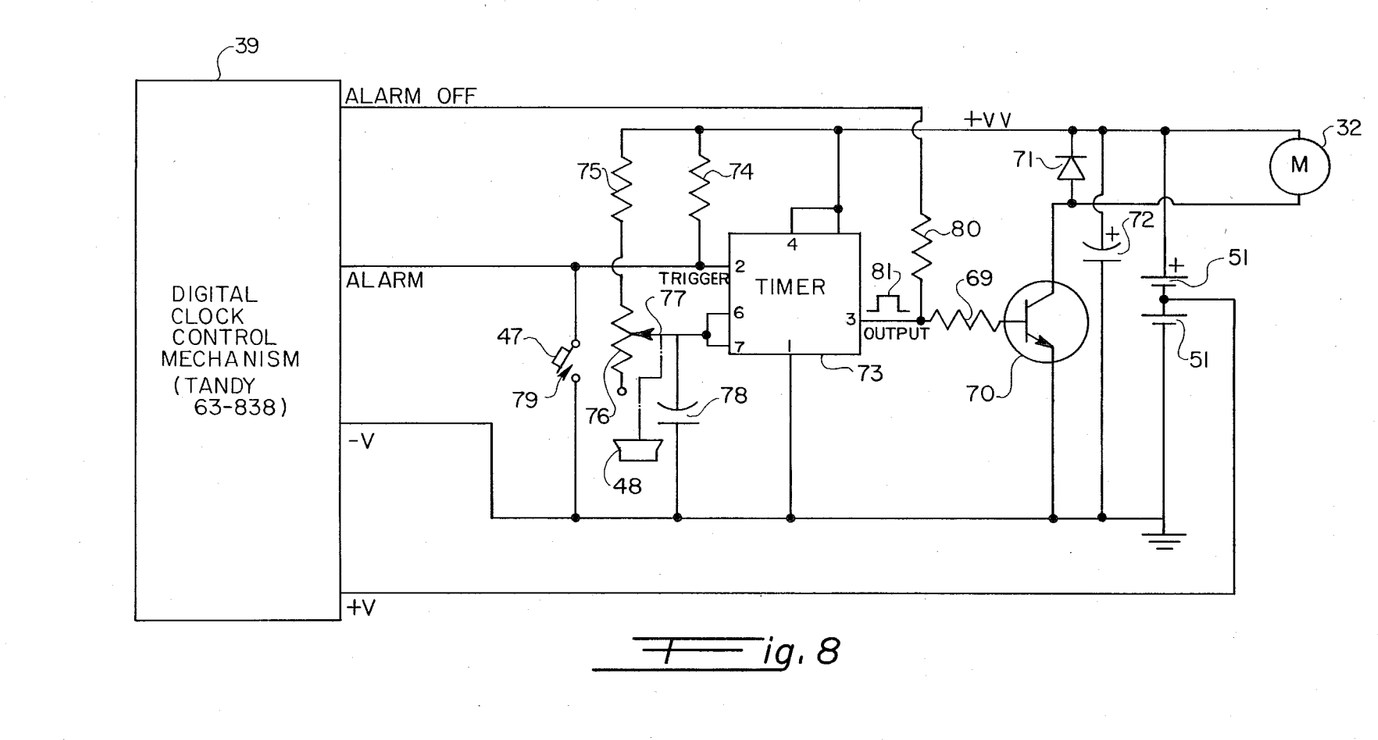
FIG. 8 is a schematic circuit diagram of a realized exemplary motor control timing circuit and d.c. motor useful in practicing the present invention.

A digital clock control mechanism 39, which may be a digital alarm clock commercially available from the Tandy Corporation under catalog No. 63-838, is mounted to the upper portion of the forward wall of the housing, as shown more clearly in FIGS. 1, 2 and 4. This digital clock control mechanism 39 is mounted on a support flange 40 (see FIG. 2) which is secured to the inside of the front wall of the housing by a fastener 41 (or other suitable means). A second flange 42 (again see FIG. 2) is secured to the front wall of the housing, above the flange 40. An L-shaped angled flange member 43 is "snap" fitted over the flanges 40 and 42 and serves as a removable cover member for the digital clock control mechanism. This removable cover member 43 may be "snapped" off, upon removal of the lid from the housing, to expose the digital clock control mechanism. The top surface of the removable cover member 43 is substantially flush with a horizontal plane encompassing the open top of the housing. As designated by the numeral 50, a motor control timing circuit, illustrated in detail in FIG. 8, is housed adjacent to the digital clock mechanism 39, a portion control knob 48 of the motor control circuit 50 being visible in FIG. 1.

Figure 5:
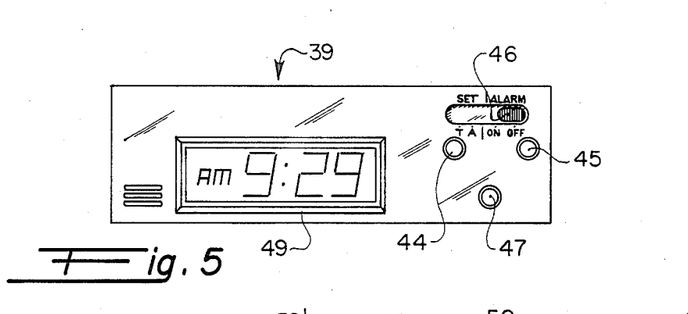
FIG. 5 is a portion of FIG. 4, drawn to an enlarged scale, and showing the details of the controls included in the digital clock control mechanism, as well as a test button for the motor control circuit.

As shown more clearly in FIGS. 4 and 5, the digital clock control mechanism 39 includes an hour set button 44, a minute set button 45, a set/alarm switch button 46, and a digital read-out clock face 49, the latter having an "AM" and a "PM" indicator. Preferably, the buzzer which normally performs the "alarm" function is removed and the circuit which normally drives the buzzer is connected directly to the trigger circuit of the timer described below. The digital clock control mechanism is powered by one of two 1.5 volt D-size batteries. The two 1.5 volt D-size flashlight batteries 51, disposed adjacent to the digital clock control mechanism 39, are provided to energize the motor 32. The flashlight batteries are connected to the motor by wires 52, as shown more clearly in FIG. 2. The batteries are easily replaceable and are low voltage for electrical safety. The motor control timing circuit 50 includes the portion control knob 48 and the test button 47, which is located on the digital clock control mechanism 39.

In operation, when the motor 32 is energized to drive the eccentric weight 35 to cause the vibrating conveyor pan 22 to vibrate, the food 53 will be vibrated off the open end 26 of the vibrating conveyor pan 22 (as shown more clearly in FIGS. 6 and 7) to be discharged on to the curved trough 36. The trough 36 communicates with the opening 36A in the front wall 12 of the housing 11, so that the food 53 will become accessible to the pet. The present invention accommodates various food sizes, and preferably, a dry type of pet food should be used.

The automatic feeder is preferably made of sheet-metal construction. The bends are made and the corners welded, and then the feeder is powder coated. Conventional equipment is used, and the feeder may be manufactured economically for widespread marketing and distribution.

The digital clock control mechanism 39 with the motor control timing circuit 50, as shown more clearly in FIGS. 4, 5 and 8, regulates respectively, the predetermined time when the pet food is dispensed and the measured amount of the food, the latter a result of the time period determined by the setting of the timing circuit 50.

Initially, the food test button 47 is depressed to operate the automatic pet feeder 10 through a cycle. If the amount of food dispensed in the food tray (that is, the forward lower end of the curved chute 36) is sufficient, the food tray may be cleaned out and the food therein placed back into the hopper. If the measured portion of food is not sufficient (or is too much), then the portion control knob 48 may be adjusted accordingly to either increase or decrease the "run" cycle of the automatic pet feeder.

Next, the set/alarm switch button 46 is moved to the "T" position (see FIG. 5) and then the hour set button 44 is pressed until the correct hour is shown on the digital read-out clock 49. This step is then repeated for the minute set button 45.

Next, to set the predetermined feed time, the set/alarm switch button 46 is moved to its "A" position, and the hour set button 44 is pressed until the correct hour (AM or PM) is shown on the digital read-out clock 49. The process is repeated for the minute set button 45. Thereafter, the set/alarm switch button 46 is moved to its "ON" position.

The setting of the digital clock control mechanism 39 is easy and convenient, being similar to that for a digital alarm clock.

As a result, the programmable automatic feeder 10 of the present invention will dispense a measured amount of food at a predetermined time, yet is rugged, reliable, relatively safe, economical to produce, and commercially practical for widespread marketing and distribution. The automatic feeder is intended primarily for dogs or cats, but is applicable to other house pets or other animals, as well as fish, wild fowl and birds, poultry and livestock, where feed control is an important consideration.

Referring now to FIG. 8, an exemplary motor control timing circuit is shown connected between the digital clock control mechanism 39 and the d.c. motor 32, which may be a 3-volts, 250 milliampere running current motor. Power for operating the digital clock control mechanism 39 is provided from one of the 1.5 volt batteries 51 which is connected, via leads 52' (FIG. 4) across power input terminals −V and +V of the digital clock control mechanism 39, the terminal −V serving as circuit reference ground.

The two series connected 1.5 volt batteries 51 are connected to the d.c. motor 32, via the collector-emitter path of a power pnp transistor 70, its collector being connected to an input terminal of the motor 32 and its emitter being connected to circuit ground. The transistor 70 may be any of a number of commercially available transistors; for example, a TIP 120 transistor has been found to be appropriate.

A diode 71 is connected across the motor so as to short out current produced by the back e.m.f. which may be produced by the d.c. motor 32 as it acts as a generator subsequent to removal of input power thereto and while it is still rotating. This prevents harm to other circuit components. A 33 uf electrolytic filter capacitor 72 is desirably connected across the series connected batteries 51, as shown.

A timer 73, which may be realized as a commercially available TLC 555 solid state electronic timer or the like, has its output pin (pin 3) conductively connected to the base of the transistor 70 via a 1.5K ohm resistor 69 for the purpose of turning the transistor 70 ON and OFF. Power for the timer 73 is provided from the series connected batteries 51 which are connected across power input pins (pins 1, 4 and bus +VV). The trigger input terminal (pin 2) of the timer 73 is connected to the alarm (enabling) output of the digital clock control mechanism 39 and to the three volts d.c. bus via a fixed 47K ohms resistor 74. A second 47K ohms resistor 75 is connected to one terminal of a 0–1M ohms rheostat 76 which has its wiper 77 mechanically connected to the portion adjusting knob 48. The wiper 77 is conductively connected to two control inputs terminals (pins 6 and 7) of the timer 73 and to circuit ground via a 33 uf capacitor 78, the capacitor 78, the adjustable rheostat 76 and the fixed resistor 75 constituting an adjustable timing circuit which sets the portion of food to be delivered.

The test button 47 (also seen in FIGS. 4 and 5) is operatively arranged to momentarily close a double-pole, single-throw switch 79, which is connected between circuit ground and the trigger input (pin 2) of the timer 73. As a practical matter the switch 79 and the button 47 are constituted by members within the digital clock control mechanism 39 which, were the mechanism used without modification, would serve as an "alarm" test button and switch (a function unneeded in the present invention). It should be appreciated that a separate button and switch could be provided, if one wished to keep the "alarm" test function. The test button 47 and switch 79 serve to test the feed delivery action without the alarm sounding.

A feedback signal is derived from the output (pin 3) of the timer 73 and fed, via a 150K ohms resistor 80, to an alarm OFF circuit point within the digital clock control mechanism for the purpose of turning the alarm OFF.

In operation, the circuit of FIG. 8 functions as set out below. Initially, the capacitor 78 is fully discharged through pin 7, and the timer 73 OFF with its output on pin 3 LOW. Upon receipt of a trigger signal, that is a momentary LOW or ground reference on the pin 2 of the timer 73, the timer quickly removes the short circuit on the capacitor 78 and the output (pin 3) goes HIGH as indicated by the pulse 81. The pulse 81 causes the transistor 70 to be turned ON and to remain ON, placing the two batteries 51 across the motor 32 which, while thus energized, effects vibratory delivery of food because it drives the eccentric 35 (FIGS. 2, 3). At the same time, a feedback signal is fed, via the resistor 80, to an alarm OFF circuit point within the digital clock control mechanism 39. The transistor 70 continues to conduct and the motor 32 continues to run for a period determined by the duration of the pulse 81, its duration being adjustable from about one second to about 30 seconds, depending on the position of the portion control knob 48 and, thus, the resistance provided by the rheostat 76. During the period the pulse 81 is present, that is HIGH, the capacitor 78 charges towards 3 volts. When the charge on the capacitor 78 reaches about two-thirds of the full three volts, it causes the timer 73 to turn OFF, the output on its pin 3 goes LOW (that is, the pulse 81 disappears) and the transistor 70 is turned OFF. The turning OFF of the transistor 70 causes the current from the batteries 51 to the d.c. motor 32 to be cut OFF and the motor stops, interrupting the supply of food. The timer 70 remains OFF until another LOW signal appears on its trigger input (pin 2) from the digital clock control mechanism 39 or as a result of the momentary closing of the switch 79 during a test.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. An automatic feeder for animals, comprising a housing including a hopper having a top portion provided with an opening, removable closure means including a lid for closing the opening in the top portion of the hopper, thereby providing access to the hopper, whereby food may be placed in the hopper, the hopper having an open bottom portion, a vibrating feed conveyor means including a vibrating pan in the housing and disposed below the open bottom portion of the hopper, whereby the food is supported on the vibrating pan, resilient means for supporting the vibrating pan, motor-driven means for vibrating the vibrating pan, the vibrating pan having at least one open portion, adjustable timing means including an electronic digital means for actuating and thereafter discontinuing the motor-driven means, and a trough disposed in the housing rearwardly of the vibrating pan, whereby when the motor-driven means is actuated via the timing means, a measured amount of food is dispensed from the vibrating pan to the trough, wherein the measured amount of food falls down the trough and forwardly thereof, and the housing including a front portion having means enabling the animal to receive the food in the trough.

2. An automatic feeder for animals, comprising a housing including a hopper having an opening, removable closure means for the opening, thereby providing access to the hopper, whereby food may be placed in the hopper, the hopper having an open bottom portion, a vibrating feed conveyor means in the housing and disposed below the open bottom portion of the hopper, whereby the food is supported on the vibrating feed conveyor means, resilient means for supporting the vibrating feed conveyor means, motor-driven means for vibrating the vibrating feed conveyor means, adjustable timing means for actuating and thereafter discontinuing the motor-driven means, and a trough disposed in the housing adjacent to the vibrating feed conveyor means, whereby when the motor-driven means is actuated via the timing means, a measured amount of food is dispensed from the vibrating feed conveyor means to the trough, and the housing having means enabling the animal to receive the food in the trough, wherein housing is substantially prismatic and has an open top providing access to hopper, and wherein the removable closure means comprises a lid covering the open top of the housing and removably secured thereto by latches.

3. An automatic feeder for animals, comprising a housing including a hopper having an opening, removable closure means for the opening, thereby providing access to the hopper, whereby food may be placed in the hopper, the hopper having an open bottom porion, a vibrating feed conveyor means in the housing and disposed below the open bottom portion of the hopper, whereby the food is supported on the vibrating feed conveyor means, resilient means for supporting the vibrating feed conveyor means, motor-driven means for vibrating the vibrating feed conveyor means, adjustable timing means for actuating and thereafter discontinuing the motor-driven means, and a trough disposed in the housing adjacent to the vibrating feed conveyor means, whereby when the motor-driven means is actuated via the timing means, a measured amount of food is dispensed from the vibrating feed conveyor means to the trough, and the housing having means enabling the animal to recieve the food in the trough, wherein the vibrating feed conveyor means comprises a vibrating pan having three closed sides and further having an open end, and wherein the trough is disposed in the housing rearwardly of the open end of the vibrating pan.

4. The automatic feeder of claim 3, wherein the vibrating pan is disposed in the housing substantially centrally thereof, wherein a plate is fixed in the housing below the vibrating pan, and wherein the resilient means comprises a plurality of spaced upstanding coil springs mounted between the fixed plate and the vibrating pan.

5. The automatic feeder of claim 3, wherein the vibrating pan has a bottom surface, and wherein the motor-driven means comprises a motor mounted on the bottom surface of the vibrating pan, the motor having a rotating shaft, and an eccentric carried on the shaft.

6. The automatic feeder of claim 3, wherein the housing has front and back walls substantially parallel to each other, and wherein the trough is substantially arcuate and extends downwardly from the back wall to the front wall of the housing.

7. The automatic feeder of claim 5, further including a baffle carried by the front wall of the housing, the baffle being disposed inwardly of the opening and above the trough, thereby preventing the animal from reaching the vibrating feed conveyor means.

8. The automatic feeder of claim 3, further including batteries in the housing for energizing the motor-driven means and the timing means.

9. An automatic feeder for animals, comprising a housing including a hopper having an opening, removable closure means for the opening, thereby providing access to the hopper, whereby food may be placed in the hopper, the hopper having an open bottom portion, a vibrating feed conveyor means in the housing and disposed below the open bottom portion of the hopper, whereby the food is supported on the vibrating feed conveyor means, resilient means for supporting the vibrating feed conveyor means, motor-driven means for vibrating the vibrating feed conveyor means, adjustable timing means for actuating and thereafter discontinuing the motor-driven means, and a trough disposed in the housing adjacent to the vibrating feed conveyor means, whereby when the motor-driven means is actuated via the timing means, a measured amount of food is dispensed from the vibrating feed conveyor means to the trough, and the housing having means enabling the animal to receive the food in the trough, wherein the means enabling the animal to receive the food in the trough comprises, the housing having a front wall provided with an opening therein, the opening communications with the trough.

10. The automatic feeder of claim 9, wherein the front wall of the housing has a slot formed therein to indicate the level of the food in the hopper.

11. An automatic feeder for animals, comprising a housing including a hopper having an opening, removable closure means for the opening, thereby providing access to the hopper, whereby food may be placed in the hopper, the hopper having an open bottom portion, a vibrating feed conveyor means in the housing and disposed below the open bottom portion of the hopper, whereby the food is supported on the vibrating feed conveyor means, resilient means for supporting the vibrating feed conveyor means, motor-driven means for vibrating the vibrating feed conveyor means, adjustable timing means for actuating and thereafter discontinuing the motor-driven means, and a trough disposed in the housing adjacent to the vibrating feed conveyor means, whereby when the motor-driven means is actuated via the timing means, a measured amount of food is dispensed from the vibrating feed conveyor means to the trough, and the housing having means enabling the animal to receive the food in the trough, wherein the adjustable timing means comprises a digital clock control mechanism having means for testing the actuation of the motor-driven means.

12. An automatic feeder for animals, comprising a substantially prismatic housing having a front wall, a back wall and side walls, the housing further having an open top, a hopper secured within the housing and accessible through the open top of the housing, whereby a predetermined quantity of food may be placed in the hopper, a removable lid covering the open top of the housing, latches removably connecting the lid to the housing, the hopper having an open bottom portion, a vibrating conveyor pan disposed below the open bottom of the hopper and arranged substantially centrally of the housing, a fixed plate secured to the housing below the vibrating conveyor pan, a plurality of substantially upstanding springs mounted between the fixed plate and the vibrating conveyor pan, such that the vibrating conveyor pan is resiliently mounted within the housing, the vibrating conveyor pan having a bottom surface, a motor carried by the bottom surface of the vibrating conveyor pan, the motor having a rotating shaft, an eccentric weight carried by the shaft, the vibrating conveyor pan further having three closed sides and an open end, an arcuate trough mounted in the housing rearwardly of the open end of the vibrating conveyor pan and extending downwardly from the back wall to the front wall of the housing, the front wall of the housing including a lower portion having an opening therein communicating with the trough, thereby enabling the animal to obtain the food dispensed in the trough, a baffle carried by the front wall of the housing above the opening therein, the baffle extending inwardly of the housing, thereby preventing the animal from being exposed to the vibrating conveyor pan resiliently mounted on the fixed plate, the front wall of the housing having an upper portion, adjustable timing means carried by the upper portion of the front wall of the housing below the removable lid, batteries carried by the upper portion of the front wall of the housing and electrically connected to the motor and to the adjustable timing means, whereby when the motor is energized by the batteries via the adjustable timing means, the vibrating conveyor pan is vibrated to dispense a measured amount of food from the vibrating conveyor pan to the trough for access through the opening in the front wall of the housing, and means for indicating the level of food in the hopper.

13. The automatic feeder of claim 12, wherein the adjustable timing means comprises a digital clock control mechanism, said digital clock control mechanism including means for setting the hour and the minute for energizing the motor to actuate the vibrating conveyor pan, means for setting the current time as to hour and minute, an adjustable feed portion control means to determine the length of time that the motor is energized, thereby determining the amount of food dispensed, and a feed test means to assure that the feeder is in working order and to test the actual portion of food being dispensed.

14. An automatic feeder for animals, comprising a housing having a front wall, back wall, and parallel side walls, the front wall including an upper portion and a lower portion, vibrating feed means disposed substantially centrally of the housing for dispensing a substantially predetermined measured amount of food, programmable adjustable timing means for controlling the vibrating feed means for dispensing the food at predetermined times, the vibrating feed means including a resiliently-mounted vibrating pan having at least one open portion, a curved trough rearwardly of the vibrating pan for receiving the substantially predetermined amount of food from the open portion of the vibrating pan, the trough being secured laterally between the side walls of the housing and extending downwardly from the rear wall of the housing to the front wall thereof, such that the food falls down the trough and towards the front wall of the housing, the lower portion of the front wall having an opening therein communicating with the trough, whereby the food is accessible to the animal, and the programmable adjustable timing means including a digital clock control mechanism including means for testing the actuation of the vibrating feed means.

15. An automatic feeder for animals, comprising a housing having a fron wall, back wall, and parallel side walls, the front wall including an upper portion and a lower portion, feed means disposed substantially centrally of the housing for dispensing a substantially predetermined measured amount of food, adjustable timing means for controlling the feed means for dispensing the food at predetermined times, a curved trough rearwardly of the vibrating feed means for receiving the substantially predetermined amount of food, the trough being secured laterally between the side walls of the housing and extending downwardly from the rear wall of the housing to the front wall thereof, such that the food falls down the trough, and the lower portion of the front wall having an opening therein communicating with the trough, whereby the food is accessible to the animal, wherein the feed means comprises a vibrating conveyor pan, a fixed plate below the vibrating conveyor pan, springs disposed between the vibrating conveyor pan and the fixed plate for resiliently mounting the vibrating conveyor pan, the vibrating conveyor pan having a bottom surface, a motor carried by the bottom surface of the vibrating conveyor pan, the motor having a rotating shaft, an eccentric weight carried by the shaft, and the vibrating conveyor pan having three sides and an open rear end, the open rear end confronting the trough.

16. In an automatic feeder for animals, the combination of a vibrating feed means including a vibrating conveyor pan for dispensing food, a motor for driving the vibrating conveyor pan, a digital clock control mechanism for controlling the energization of the motor, batteries for energizing the motor and the digital clock control mechanism, and the digital clock control mechanism including means therein for setting the hour and the minute for energizing the motor to actuate the vibrating conveyor pan, means for setting the current time as to hour and minute, an adjustable feed portion control means to determine the length of time that the motor is energized, thereby determining the amount of food dispensed, and a feed test means to assure that the feeder is in working order and to test the actual portion of food being dispensed.

17. In an automatic feeder for animals, the combination of a hopper having an open bottom, a vibrating conveyor pan disposed below the open bottom of the hopper and substantially parallel thereto, the vibrating conveyor pan having a bottom surface, a fixed plate, a plurality of upstanding coil springs mounted between the fixed plate and the bottom surface of the vibrating conveyor pan, whereby the vibrating conveyor pan is resiliently mounted, a motor carried by the bottom of the vibrating conveyor pan, the motor having a rotating shaft, an eccentric weight on the shaft, whereby when the motor is energized, the vibrating conveyor pan will be vibrated, and a programmable digital clock control mechanism for controlling the energization of the motor.

18. In an automatic feeder for animals, the combination of a housing having an open top portion provided with a removable lid, the housing further having a front wall, the front wall including an upper portion and a lower portion, a hopper in the upper portion of the housing and below the lid, whereby upon removal of the lid the feed may be placed in the hopper, the upper portion of the front wall having a vertically slotted window formed therein, whereby the level of feed within the feeder may be viewed, a programmable electronically-actuated feed dispensing means within the housing and below the hopper for dispensing the feed, a fixed trough secured within the housing for receiving the feed from the feed dispensing means, the trough being curved downwardly and forwardly of the housing, such that the feed falls down the trough and towards the lower portion of the front wall of the housing, the lower portion of the front wall of the housing including an opening therein communicating with the trough, whereby the feed is accessible to the animal, and a baffle bent inwardly of the front wall of the housing above the opening to protect the animal from reaching the feed dispensing means within the housing.

19. In an automatic feeder for animals, the combination of a housing having a front wall, the front wall including an upper portion and a lower portion, the upper portion of the front wall having a vertically slotted window formed therein, whereby the level of food within the feeder may be viewed, feed dispensing means within the housing for dispensing the food, a trough within the housing for receiving the food from the feed dispensing means, the lower portion of the front wall of the housing including an opening therein communicating with the trough, whereby the food is accessible to the animal, and a baffle bent inwardly of the front wall of the housing above the opening to protect the animal from reaching the food dispensing means within the housing, further including a digital clock control mechanism mounted on the front wall of the housing for controlling the food dispensing means at predetermined times.

20. In an automatic feeder for animals, the combination of a housing having a front wall and further having an open top, a lid removably secured to the open top of the housing, a hopper within the housing below the lid, a food dispensing means below the hopper, a trough in the housing for receiving the food, the housing having an opening therein communicating with the trough, whereby the food is accessible to the animal, a digital clock control mechanism for controlling the food dispensing means at predetermined times, the front wall of the housing having an upper portion, the digital clock control mechanism being supported by the upper portion of the front wall of the housing inwardly of the housing and substantially adjacent to the open top of the housing, and a removable cover for the digital clock control mechanism.

21. The combination of claim 20, wherein the digital clock control mechanism is mounted on a support flange secured to the front wall of the housing, the flange projecting inwardly of the housing, a second flange secured to the front wall of the housing and projecting inwardly thereof above the support flange, and wherein the removable cover comprises an angled flange member "snapped" over the support flange and the second flange, respectively, the angled flange member having a top surface substantially flush with the plane encompassing the open top of the housing.

22. An automatic feeder, comprising, in combination, a vibratory conveying means for receiving the food, a motor attached to the vibratory conveying means and having an eccentric for inducing vibrations in the vibratory conveyor means, wherein the power requirements are relatively small, a programmable digital clock control mechanism for controlling the energization of the motor, flashlight batteries for energizing both the motor and the programmable digital clock control mechanism, thereby assuring electrical safety and portability of the feeder, means for dispensing the food off the vibratory conveying means rearwardly thereof, and means for providing accessibility to the dispensed food.

* * * * *